United States Patent Office 3,817,736
Patented June 18, 1974

3,817,736
METHOD FOR FEEDING AN UNSYMMETRICAL GOB OF GLASS
Ichiro Kojo, Eiichi Nakao, and Masayuki Katsumata, Takasago, Masahiro Kitahara, Sakura, Tetsuji Tanaka, Funabashi, Shinji Wada and Taisaku Tomioka, Takasago, and Kunio Takahashi, Funabashi, Japan, assignors to Asahi Glass Company Ltd., Tokyo, Japan
Filed Sept. 14, 1972, Ser. No. 289,107
Claims priority, application Japan, Sept. 16, 1971, 46/71,238
Int. Cl. C03b 5/26
U.S. Cl. 65—129                5 Claims

ABSTRACT OF THE DISCLOSURE

A method for feeding a gob of glass by severing the molten glass extruded by a needle through an orifice positioned at the bottom of a bowl of a forehearth, the improvement which comprises altering the flow rate of the molten glass at said orifice in such a manner so as to form a gob of glass unsymmetric with respect to the center axis of the orifice.

BACKGROUND OF THE INVENTION

Field of the Invention

This invention relates to a method for feeding a gob of glass from a gob feeder.

Description of the Prior Art

It is well known that when molten glass is extruded by a needle through an orifice positioned at the bottom of a forehearth bowl to form a gob of glass to be fed to a mold, and is severed by a shear blade, the mark resulting from the cut remains in the glass at the end of the gob. The glass at the mark usually is harder than the glass of the bulk of the gob because of the local cooling imparted to the glass by the shear blade. Moreover, when molten glass is extruded through the orifice, a cord forms from the swirling of the glass around the center of the orifice. This results in a glass whose center possesses different optical properties than the glass of the peripheral portions of the gob. When the glass gob is cut by the shear blade, the cord is exposed in the sliced region of the gob.

Because the mark and the cord exposed at the sliced region of the gob, the mark and the cord of the glass gob, when loaded in a mold, are positioned at the center of the mold and are in contact with the surface of the mold. Thus, optical defects in the glass such as foams and flaws are found with the cord in important parts of products fabricated from the glass. For example, when a hollow glass product such as TV tube is formed from a gob of glass prepared by conventional methods, the cord is formed in the screen area which gives rise to a fatal defect in the TV tube. Tubes, thus formed, do not possess strict optical uniformity and are useless. In order to prevent formation of the cord in the screen area of the TV tube, consideration has been given to methods which remove the mark and cord from the central position they occupy when the glass gob is loaded in a mold. Glass products formed in that manner would have the mark and cord located in a position other than the screen area. However, no satisfactory industrial methods to overcome this difficulty have been found.

SUMMARY OF THE INVENTION

It is an object of this invention to provide a method for feeding a gob of glass so as to shift the position of the cord in the glass gob in the mold so that the glass product when formed does not have the cord in an important portion.

It is another object of this invention to provide a gob feeder in which the distribution of the flow of molten glass extruded from an orifice deviates from the center of the orifice to form an unsymmetrically shaped gob of molten glass about the center of the orifice.

Briefly, these and other objects of this invention can be achieved by providing a method for feeding a gob of molten glass to a mold by severing the gob extruded from an orifice positioned at the bottom of a bowl supplying the molten glass from a furnace, the improvement comprising a method for deviating the flow rate of the molten glass at the orifice so as to form an unsymmetrically shaped gob of glass at the orifice.

This invention also provides a gob feeder which comprises a forehearth for supplying molten glass;

an orifice ring positioned at the bottom of the bowl of said forehearth;

a needle positioned above said orifice ring;

means for cutting a gob extruded through said orifice ring, and means for deviating the molten glass so as to form an unsymmetrically shaped gob of glass.

BRIEF DESCRIPTION OF THE DRAWINGS

Various other objects, features and advantages of this invention will be more fully appreciated as the same becomes better understood from the following detailed description when considered in connection with the accompanying drawings, wherein like reference numerals designate like or corresponding parts throughout the several figures.

DETAILED DESCRIPTION OF A PREFERRED EMBODIMENT

Figure 1:
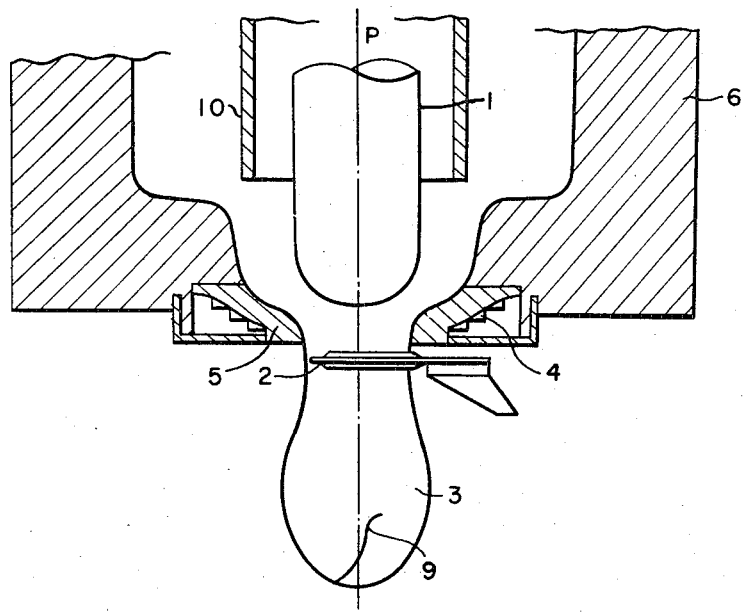
FIG. 1 is a sectional view of a conventional gob feeder.

FIG. 1 is a sectional view of a conventional gob feeder wherein the reference numeral 6 designates a bowl having an orifice for extruding molten glass. The orifice for feeding a gob of glass is formed by an orifice ring 5 at the bottom of the bowl. Reference numeral 4 designates a heater positioned under the orifice ring 5 which prevents supercooling of the molten glass with the accompanying increase in viscosity of the glass.

In the bowl, the needle 1 and the sleeve 10 are positioned centrosymmetrically about the center of the axis P of the orifice. The molten glass is uniformly stirred by the sleeve 10, rotated around the needle 1, and extruded through the orifice ring 5 to the outside of the forehearth by periodic up and down movements of needle 1. The gob of molten glass 3 extruded is severed by a pair of shear blades 2 positioned under the orifice. The severed gob drops into an apparatus and is molded. In this case, the molten glass is extruded through the orifice to give a uniform distribution in the flow thereof. Thus, a symmetrically shaped gob 3 is formed about the center of the axis P of the orifice. The cut mark 9 caused by the pair of shear blades 2 is formed at the center of the end of the gob as shown in FIG. 1, along with the cord which forms at a similar position.

Figure 3:
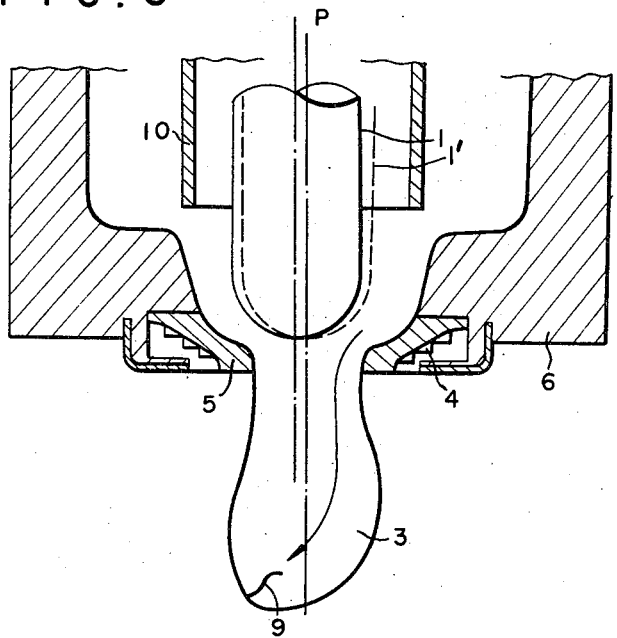
FIG. 3 is a sectional view of the gob feeder of this invention.

In the apparatus according to this invention, the distribution of the flow of molten glass extruded from the orifice deviates from the center of the orifice and an unsymmetrically shaped gob of molten glass 3 is formed about the center axis P of the orifice. The mark 9 and the cord exposed at the severed portion at the end of the gob 3 are shifted from the central position as shown in FIG. 3. This is accomplished by changing the flow rate of the molten glass extruded from the orifice in the extrusion zone of the orifice, so as to increase the flow rate of glass on one side of the gob relative to the other side. Thus, the gob 3 extruded from the orifice is formed unsymmetrically about the center axis P of the orifice. In FIG. 3, the flow rate of the molten glass on the right side of the center axis P of the orifice is greater than the flow rate of the left side. The gob 3 is shifted to the left side by the unbalanced right and left flow rates of the molten glass resulting in the shift of the mark 9 at the end of gob to the left side as shown in the drawing. When the gob 3 is severed from both sides by the shear blades 2, the mark 9 forms along a portion of the perpendicular area of the next gob that develops. In this invention, the mark 9 is shifted to one side of the center of the gob 3. Accordingly, the gob 3 must form unsymmetrically with respect to the perpendicular direction of the cut since the gob 3 is formed unsymmetrically about the center axis of the orifice.

In FIG. 3, the distribution of the flow of molten glass extruded from the orifice is deviated by shifting the position of the axis of the needle 1 from the center axis of the orifice. This forces the gob 3 to form unsymmetrically about the center axis of the orifice. In this embodiment, the position of needle 1 which aids in the extrusion of molten glass through the orifice is shifted from the original position 1' at the center axis P of the orifice. Thus the space between the needle 1 and the orifice ring 5 is altered so as to change the flow rate of the molten glass passing through the space at the center axis P of the orifice. The space on the right side of needle 1 is greater than that on the left side, so that the flow rate of the molten glass on the right side is greater than that on the left side.

Figure 2:
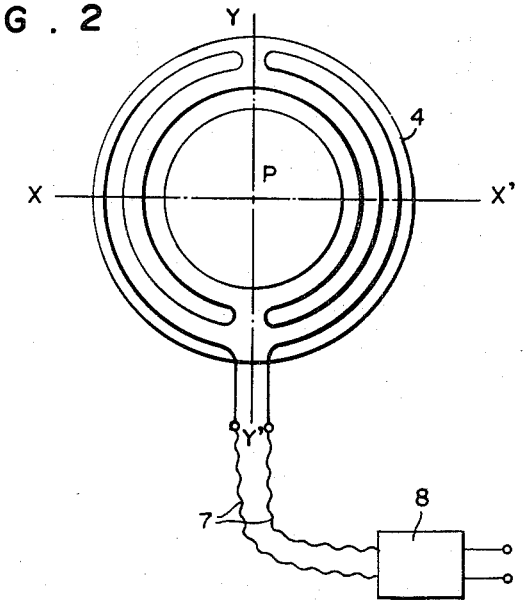
FIG. 2 is a sectional plane view of the orifice heater of the conventional gob feeder of FIG. 1.

In another embodiment of this invention a method for preparing an unsymmetrically shaped gob 3 is provided by the application of an imbalanced quantity of heat to the molten glass about the full circumference of the orifice ring 5. This results in an uneven distribution of the molten glass extruded through the orifice and gives an unsymmetrically shaped gob of glass relative to the axis P. In the method, the heater 4 is positioned around the orifice ring 5 so as to provide an imbalanced flow of heat about the center through the orifice. This results in a temperature gradient in the molten glass across the orifice and gives rise to an uneven flow of molten glass through the orifice. The heater 4 positioned under the orifice ring 5 of the conventional gob feeder is provided with a core of heating elements 4 symmetric about the X, Y axes as shown in FIG. 2. However, the heater 4 of the gob feeder of this invention is provided with an unsymmetrical core of heating elements as shown in FIGS. 4-6.

In the gob feeder of this invention, the heater 4 is preferably an electric heater, because assembly and partial temperature control are rendered easy. The heater is positioned either inside or outside the orifice ring 5 and is enveloped with a covering of heat insulating material, if necessary.

Figure 4:
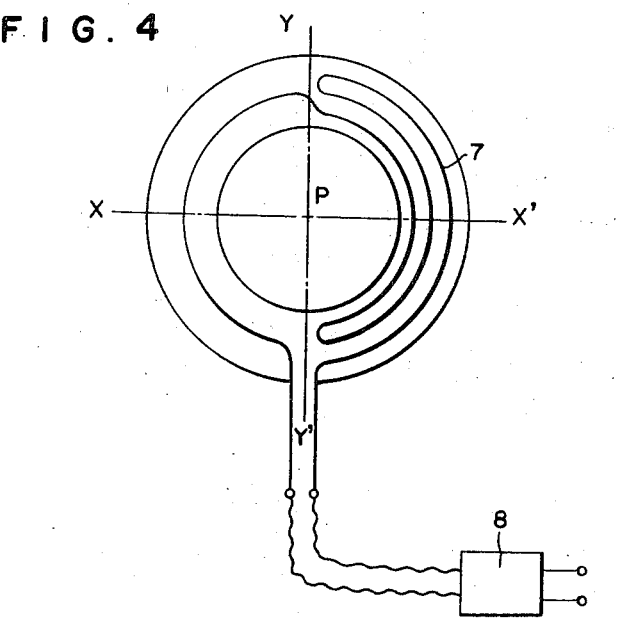
FIG. 4 is a sectional plane view of the orifice heater of the gob feeder of FIG. 3.
Figure 5:
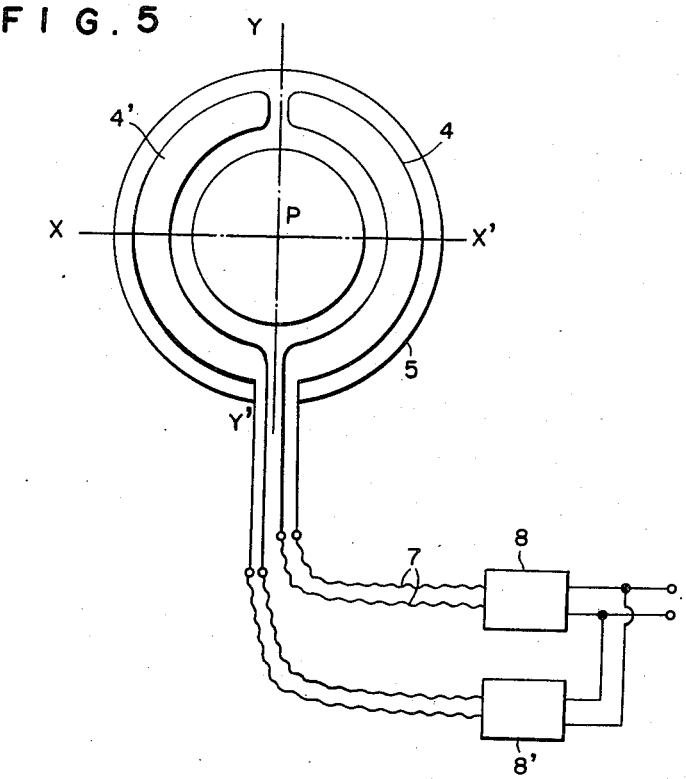
FIGS. 5 and 6 are sectional plane view of orifice heaters of other embodiments of this invention.
Figure 6:
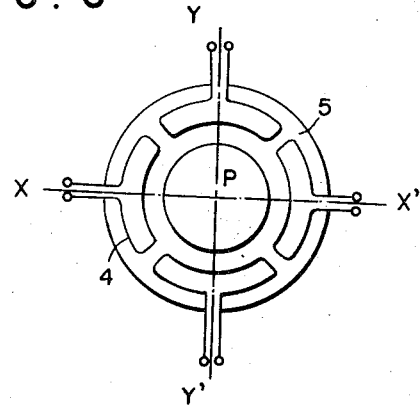

In FIGS. 4-6, the lines X and X' indicate the directions in which the gob 3 is cut after extrusion through the orifice ring 5 by a pair of shear blades. In the gob feeder of this invention, it is necessary to apply an uneven flow of heat to the molten glass with respect to both cutting paths along the X and X' axes. Thus, in the heater of FIG. 4, the additional coils of heating element 7 provide a greater heat flow through the orifice ring 5 to the glass on one of the semicircular portions of the heater than on the other semicircular portion of the heater.

In the heater shown in FIG. 5, the coiled heater element on both the right and left sides are the same length, but the right and left heater elements 4' and 4 respectively are controlled separately by controllers 8' and 8. Thus, an imbalanced flow of heat is provided to the glass by an appropriate adjustment of the controllers. In the heater shown in FIG. 6, the heater is divided into at least two heating elements disposed around the circumference of the orifice which heat different segments of the orifice. Each heating element is regulated by a separate controller.

The molten glass extruded through the orifice is usually maintained at a temperature of 1000° C.–1050° C. In the gob feeder of this invention, one side of the molten glass is usually heated to a temperature about 3–30° C. higher than the other side by a differential heater positioned beneath the orifice ring 5. The viscosity of the molten glass on the highter temperature side is decreased resulting in an increased flow rate on that side.

As the result, the molten glass 3 which is extruded through the orifice ring, gives rise to an unsymmetrical gob with the mark and the cord shifted from the center of the axis of the gob.

In the method of this invention in which the needle 1, is shifted, the space between the needle 1 and the orifice ring 5 on one side becomes narrow. Thus, care must be taken to avoid contact damage of the needle. In addition, the space between sleeve 10 and needle 1 may be altered too greatly, so that the distribution of heat of the molten glass in sleeve 10 is changed too much resulting in trouble caused by foaming in the glass. Therefore, a sufficient degree of skill is required in shifting the needle 1 as shown in FIG. 3. This problem does not arise in the method in which an uneven distribution of heat is applied to the molten glass by a modified heater. An unsymmetrical gob 3 can be formed by the application of an imbalanced flow of heat instead of shifting the needle 1. Usually, the needle is moved up and down in each cycle of gob feeding.

In another embodiment of this invention, the portion of the needle immediately above the orifice can be altered to an unsymmetrical shape so as to give a non-uniform space between the needle and the orifice about the center axis of the orifice. In this manner, the flow rate distribution of the molten glass through the orifice can be sufficiently altered about the center axis of the orifice without shifting the position of the needle, to provide an unsymmetrically shaped gob of glass.

If desired, both the position of the needle and an imbalanced heat flow can be combined to give unsymmetrically shaped gobs.

In accordance with the methods of this invention, it is also possible to alter the unsymmetrical shape of a gob to a symmetrical shape, if desired.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method for feeding a gob of glass by severing the molten glass extruded by a needle through an orifice positioned at the bottom of a bowl of a forehearth, the improvement which comprises:

altering the flow rate of the molten glass at said orifice in such a manner so as to form a gob of glass unsymmetric with respect to the center axis of the orifice, wherein said alteration of said flow rate of said molten glass is provided by altering the distance between said needle and said orifice to the center of axis of said orifice.

2. A method for feeding a gob of glass by severing the molten glass extruded by a needle through an orifice positioned at the bottom of a bowl of a forehearth, the improvement which comprises altering the flow rate of the molten glass at said orifice in such a manner so as to form a gob of glass unsymmetric with respect to the center axis of the orifice, wherein said alteration of said flow rate of said molten glass is provided by an imbalanced heat flow through said orifice ring to said molten glass.

3. The method for feeding a gob of glass as in claim 2, wherein the alteration of the flow rate of the molten glass is provided by heating one semicircular portion of the orifice to a temperature higher than the other semicircular portion of the orifice by an electric heater.

4. The method for feeding a gob of glass as in claim 2, wherein the alteration of the flow rate of the molten glass is provided by controlling the temperature of the electric heating elements disposed around the circumference of the orifice which heat different segments of the orifice by means of separate controllers for each of said heating elements.

5. The method for feeding a gob of glass as in claim 2, wherein the molten glass at one segment of the orifice is heated to a temperature higher than that of the other segments disposed around the circumference of the orifice.

References Cited

UNITED STATES PATENTS

| | | | |
|---|---|---|---|
| 2,186,718 | 1/1940 | Ferguson | 65—128 |
| 1,680,543 | 8/1928 | Howard | 65—128 |
| 3,119,679 | 1/1964 | Seymour | 65—127 |
| 1,852,719 | 4/1932 | Howard | 65—127 |

FRANK W. MIGA, Primary Examiner

U.S. Cl. X.R.

65—127, 128, 331